C. A. PETTIT.
ROPE COUPLING.
APPLICATION FILED MAY 2, 1919.
1,374,469.
Patented Apr. 12, 1921.
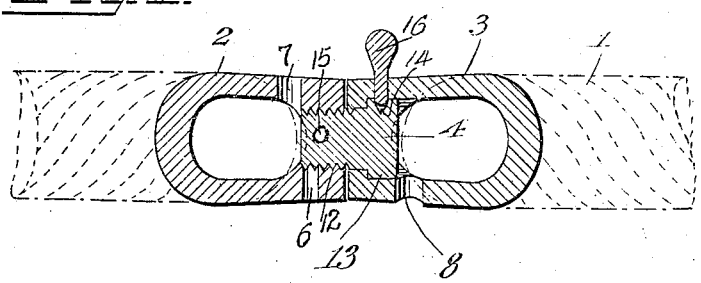
Fig. 1.
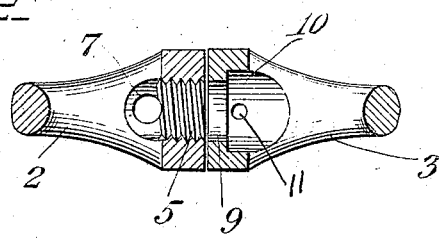
Fig. 2.
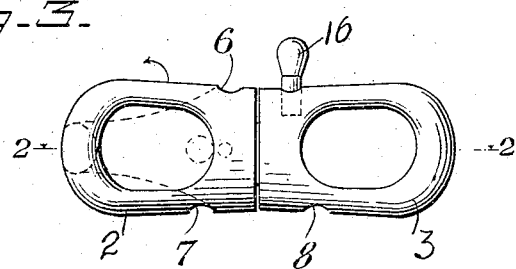
Fig. 3.
Fig. 5.
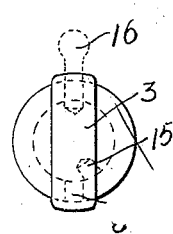
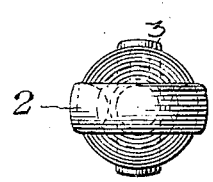
Fig. 4.
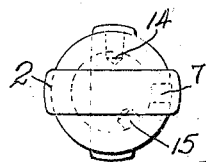
Fig. 6.
Inventor:
Charles A. Pettit,
By
ATTORNEYS.

UNITED STATES PATENT OFFICE.

CHARLES A. PETTIT, OF ST. LOUIS, MISSOURI, ASSIGNOR TO C. W. HUNT COMPANY, INC., OF WEST NEW BRIGHTON, NEW YORK, A CORPORATION OF NEW YORK.

ROPE-COUPLING.

1,374,469.   Specification of Letters Patent.   Patented Apr. 12, 1921.

Application filed May 2, 1919. Serial No. 294,198.

*To all whom it may concern:*

Be it known that I, CHARLES A. PETTIT, a citizen of the United States, and a resident of the city of St. Louis and State of Missouri, have invented new and useful Improvements in Rope-Couplings, of which the following is a full, clear, and exact description.

This invention relates to rope couplings, and has for its object the provision of a coupling which may be adapted to connect the ends of power-transmission or drive ropes together without the necessity of splicing the ropes upon the sheaves; and, further, to permit the slack or stretch of such rope to be taken up, instead of having to resplice the same.

Another object of this invention is to provide a rope coupling in which the torsion of the rope would effectually prevent any loosening of the coupling.

Reference is to be had to the accompanying sheet of drawings, in which—

Figure 1 is a sectional side view of my improved coupling;

Fig. 2 is a section taken along the line 2—2 of Fig. 3;

Fig. 3 is a side view;

Fig. 4 is an end view;

Fig. 5 is a detail end view looking from the right of Fig. 1.

Fig. 6 is an end view looking from the left with the member 2 in the dotted line position as shown in Fig. 3.

In all of these views like reference numerals designate similar parts, and the reference numeral 1 identifies the rope, the ends of which are to be connected by means of the coupling, which latter comprises a pair of links 2 and 3 and a left-hand screw-threaded, headed plug 4. The link 2 includes a link portion and a base formed with a screw-threaded opening 5, the threads of which opening extend in a spiral in opposition to the twist of the rope. Extending from the screw threads 5 through to the outer surface of the bore is an opening 6, for a purpose hereinafter more fully specified. A spanner wrench opening 7 is preferably provided in connection with the link 2.

The link 3 is also provided with a spanner wrench opening 8, and the base of such link is formed with a recess 9 terminating in a bore 10 from the face of which extends an opening 11 through to the outer surface of the base of the link 3.

The plug 4 is provided with a body portion 12, having left-hand screw threads on its outer surface, which extends within the base of the link 2 and engages the screw threads in the opening formed therethrough, and also extends beyond the screw-threaded opening into the bore 10 and terminates in a head 13 resting in the recess 9. The plug 4 is formed with an opening 14 in its head 13, and with a further opening 15 in the screw-threaded body portion 12. A pin 16 projects into either the opening 6 and its underlying opening 15, or into the opening 11 and its underlying opening 14.

In operation should it be desired to splice two ends of a rope together, all that it will be necessary for the operator to do is to position the plug 4 within the base of the link 3 and insert such plug within the screw-threaded opening 5 of the link 2 until the opening in the screw-threaded portion of the plug 4 alines with the opening 6 through the base of the link 2. The turning of the links may be readily accomplished by means of a spanner wrench, if it is not desired to rotate them by hand. A pin, such as 16, is now inserted through the opening 6 and into the opening formed in the screw-threaded portion of the plug 4, so as to hold the one with respect to the other. It will be seen that in this position the link 3 is free to rotate around the head 13 of the plug 4 by virtue of the fact that the plug is not firmly seated so as to clamp the links 2 and 3 together. The rope 1 secured to the link 3 may now be twisted so as to shorten the same and prevent any slackness; and upon sufficient torsion having been imparted to this rope, the pin 16 may be removed from the opening 6 and inserted into the opening 14 through the opening 11, it being appreciated that the turning of the link 3 is also accomplished, preferably, by means of a spanner wrench engaging the opening provided for this purpose adjacent the base of the link 3.

It will now be obvious that the insertion of the pin within the openings 11 and 14 will cause the holding of the head with respect to the link 3, and the torsion of the rope 1 will tend to rotate the link 3 with respect to the link 2, and, by virtue of the left-hand thread upon the plug, the links 2 and 3 will be drawn tighter together. If the torsional effect above referred to is not found sufficient to adequately produce this result, it will be seen that the links 2 and 3 may be brought into firm engagement by means of spanner wrenches. It will be apparent to those skilled in the art that the links may be held against relative movement by means other than those provided herein, and need not necessarily be drawn into engagement one with the other. Upon the final position of the links 2 and 3 being reached, the pin may be withdrawn from the openings 11 and 14, and it will be found that any strain, such as a twist by the rope, which would always be in a direction counter to the twist of the threads, would cause the links 2 and 3 to become still more firmly locked one with respect to the other.

Having now described my invention, what I desire to claim is:

1. A rope coupling, including a pair of links formed with bases provided with openings adapted to aline, a screw-threaded headed plug positioned within such openings, such plug being formed with an opening in the outer surface of its body and head, the links being also provided with openings adapted to aline with the aforementioned openings in the plug and means adapted to be inserted through such openings whereby to lock the plug with respect to either of such links.

2. A rope coupling, including a pair of links, one of said links being formed with a screw-threaded opening, the screw threads thereof extending in a spiral in opposition to the twist of the rope adapted to be engaged by said links, a plug extending between said links and being formed with a shank provided with screw threads adapted to engage said screw-threaded opening, the opposite end of said plug engaging the second of said links and being freely rotatable with respect thereto, said plug being adapted to be held against rotation with respect to either of said links and being capable of drawing one of said links toward the other of said links and into firm engagement therewith, whereby to prevent movement of one with respect to the other.

3. A rope coupling, including a pair of links, one of said links being formed with a screw-threaded opening, the screw threads thereof extending in a spiral in opposition to the twist of the rope adapted to be engaged by said links, a plug extending between said links and being formed with a shank provided with screw threads adapted to engage said screw-threaded opening, the opposite end of said plug engaging the second of said links and being freely rotatable with respect thereto, each of said links being provided with secondary openings capable of being brought into alinement with openings formed in said plug, and a pin adapted to extend through the openings in said links and into the openings in the plug upon the same being brought into alinement one with the other.

4. A rope coupling, including a pair of links, one of said links being formed with a screw threaded opening, the screw threads thereof extending in a spiral in opposition to the twist of the rope adapted to be engaged by said links, a plug extending between said links, and being formed with a shank provided with screw threads adapted to engage said screw threaded opening, the opposite end of said plug engaging the second of said links and being freely rotatable with respect thereto, said plug being capable of drawing one of said links toward the other of said links, and preventing movement of one with respect to the other.

CHARLES A. PETTIT.